United States Patent [19]

Brown

[11] 4,407,915

[45] Oct. 4, 1983

[54] SECONDARY ZINC ELECTRODE

[75] Inventor: David J. Brown, Solihull, England

[73] Assignee: Lucas Industries Limited, Birmingham, England

[21] Appl. No.: 320,841

[22] Filed: Nov. 12, 1981

Related U.S. Application Data

[63] Continuation of Ser. No. 159,656, Jun. 16, 1980.

[30] Foreign Application Priority Data

Jun. 26, 1979 [GB] United Kingdom ............... 7922176

[51] Int. Cl.³ ............................................. H01M 4/62
[52] U.S. Cl. ................................... 429/217; 429/229; 429/232
[58] Field of Search ....................... 429/206, 229–232, 429/217

[56] References Cited

U.S. PATENT DOCUMENTS 3,493,434 2/1970 Goodkin .............................. 429/231

FOREIGN PATENT DOCUMENTS 2093264 1/1972 France .

OTHER PUBLICATIONS

Derwent Japanese Patents Report, Abstract 46900u, (JA7326488), vol. U,33, Sep. 18, 1973.

Primary Examiner—Anthony Skapars
Attorney, Agent, or Firm—Holman & Stern

[57] ABSTRACT

A pressed, secondary zinc electrode has dispersed therein particulate carbon in an amount between 1 and 50% by weight of the total weight of zinc and carbon and an organic binder in an amount between 0.5 and 10% by weight of the total weight of zinc and carbon.

13 Claims, 6 Drawing Figures

SECONDARY ZINC ELECTRODE

This is a continuation of application Ser. No. 06/159,656, filed June 16, 1980.

BACKGROUND OF THE INVENTION

1. Field of the Invention

This invention relates to a secondary zinc electrode particularly, but not exclusively, for use in a nickel/zinc or silver/zinc electrochemical cell.

To date, zinc electrodes used in rechargeable electrochemical cells have suffered from a number of shortcomings, one of the most serious of which is a tendency for the zinc to migrate from the periphery to the centre of the electrode. This phenonenon, which is generally referred to as "shape change," leads to the edges of the electrode becoming inactive and also reduces the activity at the centre of the electrode by causing the density of the zinc at the centre to increase, A further problem associated with secondary zinc electrodes is that, during charging, metallic zinc produced by ion reduction is deposited on the electrode in the form of dendrites which grow in a direction substantially perpendicular to the electrode. This growth may occur through the separators provided between the positive and negative electrodes in an electrochemical cell and thereby cause internal short circuits.

2. Description of the Prior Art

Among the solutions which have been proposed to the problem of shape change is the incorporation of an organic binder, particularly polytetrafluoroethylene, in the electrode. However, although the solutions so far proposed have resulted in some reduction in the amount of shape change, they have not proved entirely statisfactory. One particular problem in this context is that, when polytetrafluoroethylene alone is incorporated in the electrode, the polytetrafluoroethylene tends to coagulate as a film on the outside of the electrode during cycling. This not only reduces the useful effect of the binder in avoiding shape change but also increases the resistance of the associated electrochemical cell. Another proposal for reducing the problem of shape change is to produce highly porous (i.e. having at least 60% open pores) zinc electrodes. However, this not only results in an increase in the volume of the electrode and hence a decrease in its volumetric energy density, but also reduces the strength of the electrode.

French Pat. No. 2264401 describes an alternative form of secondary zinc electrode which is produced by applying to a collecting grid a non-hardened mixture containing particulate zinc oxide, a binder such as polytetrafluoroethylene, polyvinyl alcohol, polypropylene, polyethylene or carboxymethyl cellulose and other substances, such as rayon fibres or metal powders. However, this electrode still suffers from the problems of dendritic growth and, in particular, shape change or deformation, probably as a result of movement of the electrolyte parallel to the surface of the electrode during the charging and discharging cycles. As a result, the service life of this electrode is very short.

Yet another problem experienced with conventional secondary zinc electrodes is that, with repeated discharging and charging cycles, the crystal size of the zinc increases, which contributes to a rapid decrease in the capacity of the cell.

SUMMARY OF THE INVENTION

An object of the present invention is therefore to overcome or alleviate the above-mentioned disadvantages experienced with conventional secondary zinc electrodes.

Accordingly, the invention resides in a pressed, secondary zinc electrode having dispersed therein particulate carbon in an amount between 1 and 50% by weight of the total weight of zinc and carbon and an organic binder in an amount between 0.5 and 10% by weight of the total weight of zinc and carbon.

The electrode described in the preceding paragraph is a pressed electrode and hence is relatively compact and strong. However, although the applied pressure used to produce the electrode necessarily reduces its porosity (typically to about 50%), it is found that the dispersed carbon avoids any tendency for the binder to coagulate as a film on the exterior of the electrode so that the problems of shape change and increasing cell resistance are decreased. In addition, the presence of carbon is found to decrease crystal growth and to improve the efficiency of the electrode and the power density as observed in the discharge voltage profile. Further, dispersion of the carbon in the mix used to produce the electrode is readily achieved and is susceptible to large scale production. Moreover, it is found that the inclusion of carbon in the mix allows the rapid and controllable production of a fibrous character necessary for good electrode performance. An additional advantage arising from the carbon addition is that, as a result of the improved current density distribution across the electrode, dendritic growth is substantially retarded and only effectively occurs after the zinc oxide reservoir within the electrode is consumed during charging. Moreover, growth is even across the face of the electrode and not as massive dendrites concentrated at particular points. In this respect, it is to be understood that during discharge of a secondary zinc electrode, zinc is converted to zinc oxide, $Zn(OH)_2$ and/or $Zn(OH)_4^{2-}$, whereas during charging the zinc oxide and any hydroxide species are converted back to metallic zinc. Thus, when the electrode is initially produced, the zinc will normally be present as an oxide or hydroxide.

In the electrode of the invention, the carbon content must be between 1 and 50% based on the total weight of zinc and carbon, since it is found that the improvements resulting from the addition of carbon are negligible below the 1% value. The properties of the electrode improve as the carbon content is increased above the 1% value until a maximum is reached when the electrode contains about 20% carbon based on the total weight of zinc and carbon. This is therefore the preferred value for the carbon content. When the carbon content is increased above 20, improved performance obtained by the use of carbon is more than outweighed by the decrease in the gravimetric and, particularly, the volumetric energy density of the electrode, but nevertheless the properties of the electrodes remain attractive until the 50% upper limit is reached.

The particle size of the particulate carbon used in the electrode of the invention is not critical, but generally it is found that good results are obtained with powdered carbon having a particle size between 0.5 and 20 microns.

The amount of the organic binder in the electrode is between 0.5 and 10% based on the total weight of zinc and carbon, since below 0.5% there is insufficient binder present for it to achieve its required binding function. On the other hand, if the binder content is increased above the 10% value, the resultant decrease in the amount of active material leads to a reduction in the volumetric energy density of the electrode without any compensating advantage resulting from the increased binder. A desirable value for the amount of the binder is 2.5% based on the total weight of zinc and carbon since, although the cycle life of the electrode can be improved by increasing the content to 5% on the total weight of zinc and carbon, this is only at the expense of the volumetric energy density of the electrode.

Preferably, the organic binder is polytetrafluoroethylene.

Preferably, the electrode also contains one or more of the metal oxides, mercuric oxide, cadmium oxide and lead oxide, the or each metal oxide being present in an amount beteen 0.1 and 10% based on the total weight of zinc and carbon.

More preferably, said one or each metal oxide is present in an amount between 1 and 2% based on the total weight of zinc and carbon.

In the instant specification, where a secondary zinc electrode is referred to as containing a specified percentage of a given component based on the total weight of zinc and carbon in the electrode, the weight of zinc in said total weight is the weight of metallic zinc even though the zinc may be present as a zinc oxide or hydroxide.

BRIEF DESCRIPTION OF THE DRAWINGS

In the accompanying drawings.

DETAILED DESCRIPTION

Figure 1A:
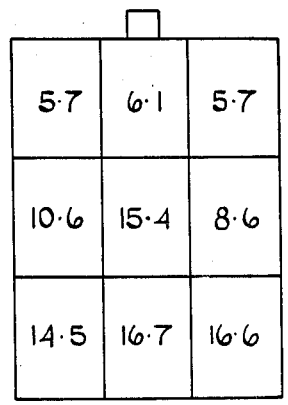
FIGS. 1a and b illustrate the amounts of shape change exhibited by a conventional secondary zinc electrode (FIG. 1a) and an electrode produced according to one example of the invention (FIG. 1b), FIGS. 2a and b are photo-micrographs illustrating the crystal structure of a conventional secondary zinc electrode (FIG. 2a) and an electrode according to said one example (FIG. 2b) after thirty discharging and recharging cycles.

Referring to the drawings, the electrode of said one example was produced by mixing the following components in a Winkworth 2Z blade mixer for fifteen minutes:

500 g of Analar grade zinc oxide supplied by Fisons Ltd, 100 g of graphite supplied by Rocol Ltd., as Type KS2.5, and having a particle size of 2.5 microns (corresponding to 20% graphite by weight of the total weight of zinc and graphite).

5 g of Analar grade red mercuric oxide as supplied by British Drug Houses Limited, 12.5 g of polytetrafluoroethylene supplied as a 60% aqueous suspension by I.C.I. Ltd., as type GP1 (corresponding to 2.5% by weight of polytetrafluoroethylene based on the total weight of zinc and graphite), and 600 cc of water.

Immediately on mixing, it was found that the mix assumed a fibrous character whereas, if the carbon was omitted from the mix, it was found that mixing had to be effected for fifteen minutes before a fibrous character was achieved. After mixing was complete, the composition was removed from the mixer and left to dry overnight in an oven at a temperature of 90° C. The mix was then returned in a dry condition to the mixer and was broken up by operation of the mixer for 5 to 10 minutes. 350 cc of laboratory grade propane 1-2 diol as supplied by British Drugs Houses Ltd., were then added to the mix, whereafter mixing was continued for a further 30 minutes. A dough-like active material was thereby produced and, after removal from the mix, was rolled into strips of the required thickness (about 0.03 inch) which were then returned to the oven for drying.

Two of the dried strips, each of which conveniently weighed about 23.5 g, were then pressed at 2000 psi against opposite sides respectively of a current collector in the form of a sheet of Analar grade copper foil as supplied by British Drugs Houses Ltd., the sheet conveniently being 0.1 mm thick, 150 mm long and 92 mm wide. The resulting electrode had a porosity of about 50% and was then wrapped in one layer of a non-woven polyamide material as sold by Carl Freudenberg as Viledon FT2119, and three layers of micro-porous polypropylene as supplied by Celenese Ltd., (U.S.A.), as Celgard 3400.

The wrapped electrode was tested in a cell employing a sintered nickel cathode and an aqueous electrolyte containing 30% by weight of potassium hydroxide, 1% by weight of lithium hydroxide to enhance the capacity of the nickel cathode, and 8% by weight of zinc oxide as a stabilizer against dissolution of the zinc anode. The cell was subjected to accelerated charging and discharging cycles using a charging current of 2.5 amps for 122.4 minutes to achieve an overcharge of about 2% and a discharge current of 5 amps for about 60 minutes. The results of the tests on the electrode of the above example and comparative tests on a similar electrode produced from a mix without carbon are illustrated in FIGS. 1 and 2 of the accompanying drawings.

Figure 1B:
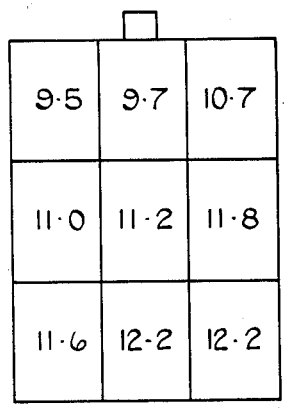

Thus, to test the effect of the carbon addition on shape change, the electrode of said one example was divided into nine equal segments after 150 charging and discharging cycles and the amount of zinc in each segment was measured as a percentage of the total active material. The same operation was repeated for the comparison electrode, although in this case the electrode was only subjected to 140 charging and discharging cycles. The results for the comparison electrode are shown in FIG. 1a and for the electrode of said one example in FIG. 1b. From these results it will be seen that the electrode of said one example exhibited considerably less shape change than the comparison electrode.

Figure 2A:
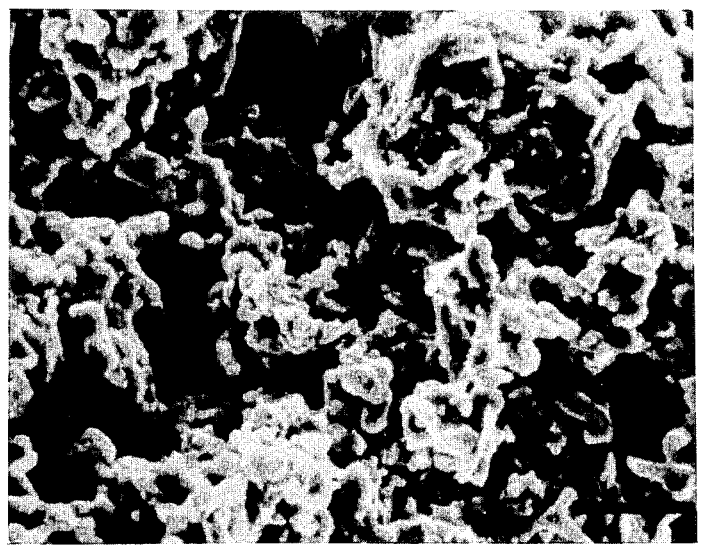
Figure 2B:
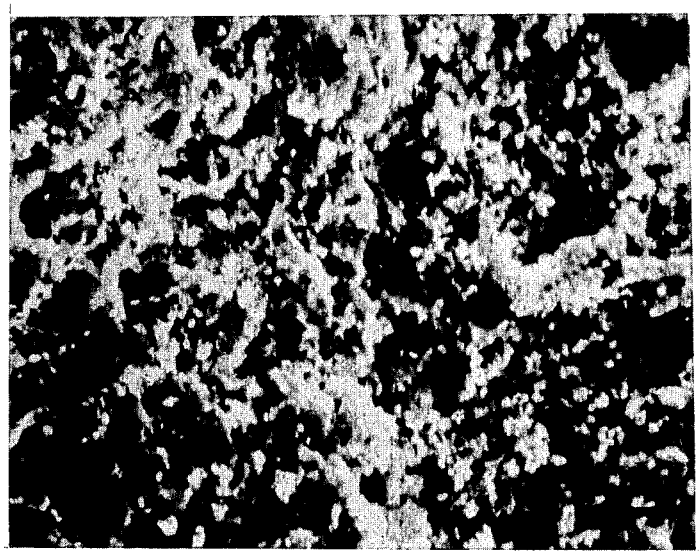

Turning now to FIGS. 2a and b which are photo micrographs at 2500 magnification of the electrode of said one example and the comparison electrode after 30 charging and discharging cycles, it will be seen that the inclusion of carbon in the electrode inhibited crystal growth. In particular, with a carbon-containing electrode having an average particle size after one cycle of 0.3–0.4 micron, it was found that the particle size was virtually unchanged after the 30 cycle test (FIG. 2b). In contrast, with the comparison electrode containing no carbon, it was found that the particle size had increased to 2-3 micron after the 30 cycle test (FIG. 2a).

Figure 3:
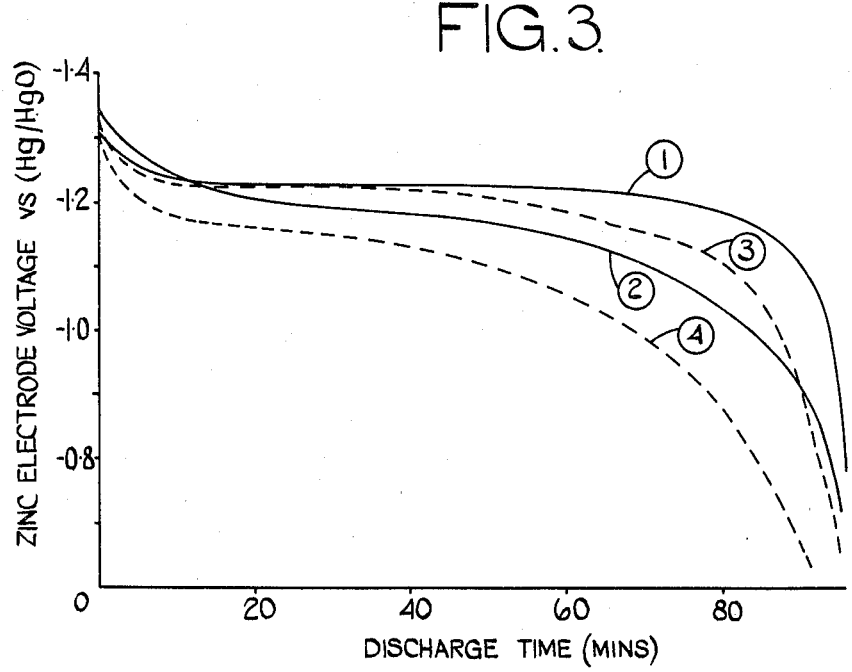
FIG. 3 is a graph comparing the voltage discharge curve of a conventional secondary zinc electrode and the electrode according to said one example.
Figure 4:
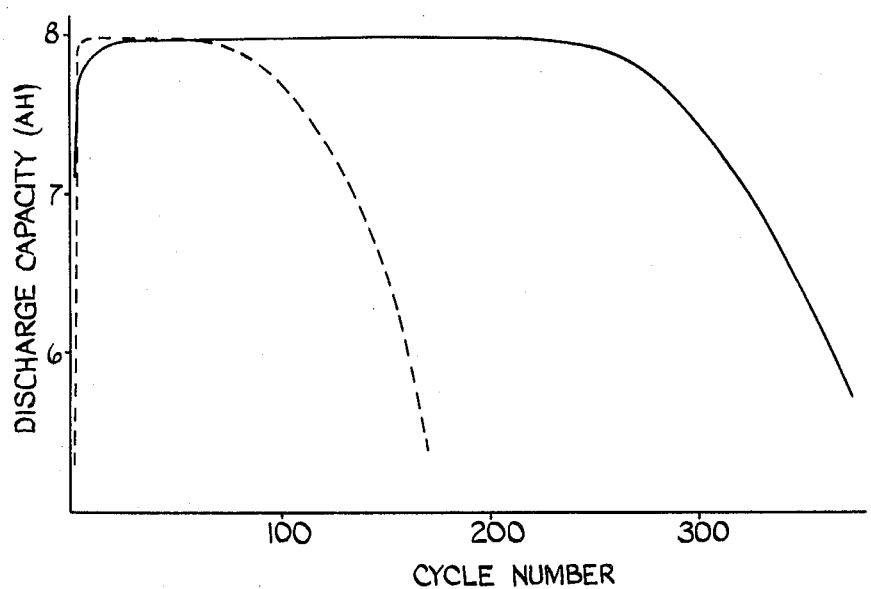
FIG. 4 is a graph of discharge capacity against the number of charging and discharging cycles for said conventional electrode and the electrode of said one example.

A further wrapped electrode was produced in the same manner as described above and was tested in the same cell as previously, but now the charging and discharging cycles were carried out using a charging current of 2.5 amps for 195.8 minutes and a discharge current of 5 amps for 96 minutes. The results of these tests and comparative tests on a similar electrode produced from a mix without carbon are illustrated in FIGS. 3 and 4 of the accompanying drawings. In FIG. 3, the continuous line 1 is the discharge curve for the electrode of said one example after 10 and 100 cycles, whereas the continuous line 2 is the discharge curve for the electrode of said one example after 200 cycles. The broken lines 3 and 4 in FIG. 3 are the discharge curves for the comparison electrode after 10 and 100 cycles respectively. From FIG. 3, it will be seen that the zinc electrode containing carbon exhibited an improved initial voltage discharge curve over the comparison electrode and that the rate of decay of the discharge characteristics was less in the case of the electrode containing carbon. As will be seen from FIG. 4, in which the solid line represents the carbon-containing electrode and the broken line represents the comparison electrode, the carbon-containing electrode maintained its discharge capacity over a considerably larger number of cycles than the comparison electrode. Similar effects were observed in the charging characteristics of the electrode and hence the inclusion of carbon produced an electrode having improved power density and efficiency. This in turn led to reduced dendritic growth.

As an alternative to the above example, the mercuric oxide can be replaced by cadmium oxide and/or lead oxide to achieve an electrode exhibiting similar advantageous properties.

I claim:

1. In a pressed, secondary zinc electrode for a secondary cell, the improvement comprising said electrode having dispersed therein particulate carbon in an amount between 20 and 50% by weight of the total weight of zinc and carbon and an organic binder in an amount between 0.5 and 10% by weight of the total weight of zinc and carbon.

2. An electrode as claimed in claim 1 wherein the organic binder is polytetrafluoroethylene.

3. An electrode as claimed in claim 1 or claim 2 wherein the particle size of the carbon is between 0.5 and 20 microns.

4. An electrode as claimed in claim 1 wherein the carbon is graphite.

5. An electrode as claimed in claim 1 wherein carbon content is 20% based on the total weight of zinc and carbon.

6. An electrode as claimed in claim 1 and containing one or more of the metal oxides, mercuric oxide, cadmium oxide and lead oxide, the or each metal oxide being present in an amount between 0.1 and 10% based on a total weight of zinc and carbon.

7. An electrode as claimed in claim 6, wherein said one or each metal oxide is present in an amount between 1 and 2% based on a total weight of zinc and carbon.

8. A nickel/zinc electrochemical cell including an electrode as claimed in claim 1.

9. A silver/zinc electrochemical cell including an electrode as claimed in claim 1.

10. An electrode as claimed in claim 1 wherein said amount of carbon is 30 to 50% by weight.

11. An electrode as claimed in claim 1 wherein said amount of carbon is 40 to 50% by weight.

12. An electrode as claimed in claim 1 wherein said amount of carbon is 30% by weight.

13. An electrode as claimed in claim 1 wherein said amount of carbon is 40% by weight.

* * * * *